May 17, 1932.  J. BURKHARDT  1,859,021

METHOD OF PRODUCING MOTION PICTURES

Filed Jan. 9, 1929  2 Sheets-Sheet 1

INVENTOR
Jakob Burkhardt
BY Chappell Earl
ATTORNEYS

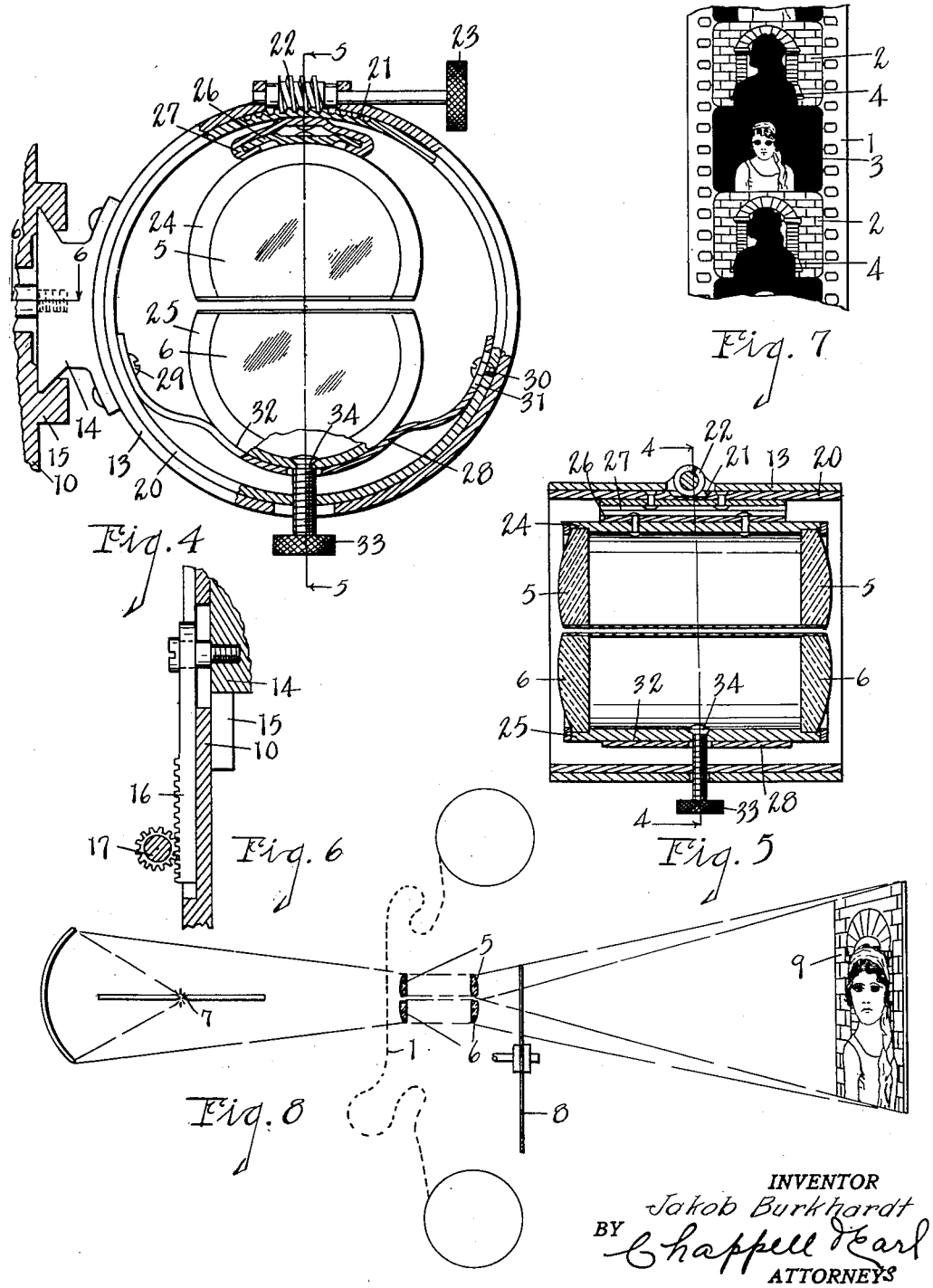

Patented May 17, 1932

1,859,021

UNITED STATES PATENT OFFICE

JAKOB BURKHARDT, OF DETROIT, MICHIGAN, ASSIGNOR TO THIRD DIMENSION PICTURES, INC., OF NEW YORK, N. Y., A CORPORATION OF NEW YORK

METHOD OF PRODUCING MOTION PICTURES

Application filed January 9, 1929. Serial No. 331,309.

The main objects of this invention are:

First, to provide a method of producing relief or stereoscopic effects in motion pictures which is very practical and may be economically practiced.

Second, to provide a method of producing relief or stereoscopic effects in motion pictures by means of which highly desirable results may be had.

Objects pertaining to details and economies of my invention will definitely appear from the description to follow. The invention is defined in the claims.

A structure embodying my improvements and the manner of practicing the method is clearly illustrated in the accompanying drawings, in which:

Fig. 4 is a detail view partially in vertical section on line 4—4 of Figs. 1 and 5 showing details of the lens box and its mounting.

Fig. 5 is a longitudinal section on line 5—5 of Figs. 2 and 4.

Fig. 6 is a fragmentary section on line 6—6 of Figs. 1 and 3 showing details of the adjustment of the lens box bracket.

Fig. 7 is a fragmentary view of a film suitable for use in the practice of my method.

Fig. 8 is a diagrammatic view conventionally illustrating an apparatus and projected picture.

The films which I employ are such as are illustrated and described in my Patent No. 1,771,029, issued July 22, 1930, and comprise a series of background pictures and a series of foreground pictures arranged in associated pairs, preferably alternately on the film, the film 1 being indicated at Fig. 7. The background pictures are shown at 2 and the foreground pictures at 3.

Each background picture has thereon or includes a mask of the foreground picture. This light excluding mask is without detail. It may be black or blackish or colored or otherwise treated to bring out the desired effect. The film is advanced through a projecting machine in the regular way, two pictures however being simultaneously projected upon a screen with the foreground or image picture registering with the mask. This mask prevents or at least reduces the light passing through that portion of the film so that the image stands out clearly and has the appearance of relief relative to the background.

I am thus able to secure relief or stereoscopic effects in a very simple and practical manner. In Fig. 8, I illustrate the general relation of the parts, the film 1 being passed before lenses 5 and 6. The light is indicated at 7, the shutter at 8 and the projected superimposed pictures at 9. It will be understood that no attempt at accuracy is made in either the film or the projected pictures in Figs. 7 and 8.

Figure 1:
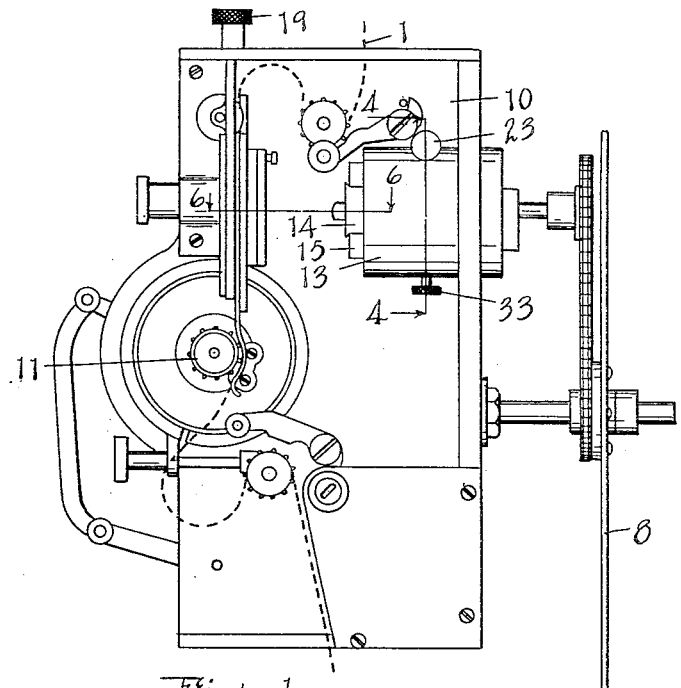
Fig. 1 is a side view of a projecting machine embodying the features of my improvements and which may be employed in the practice of my method.
Figure 3:
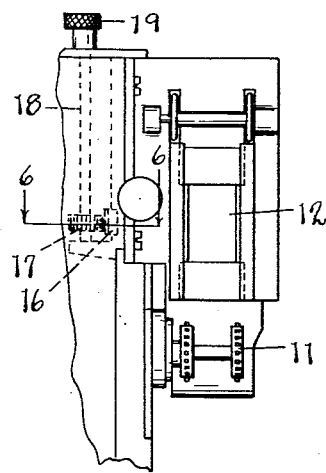
Fig. 3 is a fragmentary rear elevation.
Figure 2:
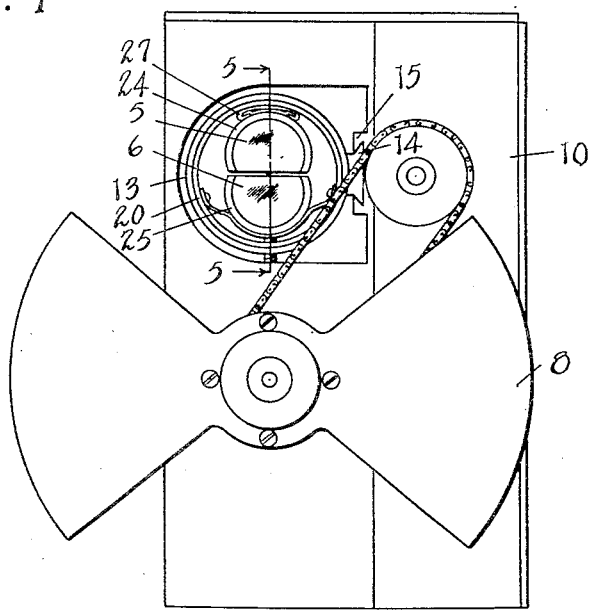
Fig. 2 is a front elevation, parts being shown conventionally.

In Figs. 1 to 6 inclusive, I show an apparatus which may be employed in the practice of my method, various parts here being shown conventionally as the details thereof form no part of this invention.

10 represents the cabinet or housing of the machine on which is mounted the shutter 8 and the film driving means designated generally by the numeral 11 which may be of the type now quite generally used.

The window 12 is of such size that a pair of adjacent pictures, a foreground and a background, may be projected simultaneously therethrough, the film being carried past this window by the feed mechanism as is well understood.

The lens bracket 13 is cylindrical and is provided with a slide 14 slidable in a way 15. A rack 16 is secured to the slide 14 and coacts with a pinion 17 on the spindle 18 having a finger piece 19 at the top of the cabinet. By this means the lens bracket and the lens box carried thereby are adjusted axially. The lens box 20 is also cylindrical and is mounted for rotative adjustment within the bracket, the lens box having a toothed segment 21 with which the adjusting worm 22 coacts. This adjusting worm has a finger piece 23.

Within the lens box I mount a pair of lens holders 24 and 25, the lens holder 24 carrying the lens 5 while the lens holder 25 carries the lens 6. The lens holder 24 is provided with a slide 26 supported and slidable in the way 27 so that the lens holder may be adjusted longitudinally of the lens box. The lens holder 25 is mounted on a support 28 in the form of a spring, one end of which is secured to the lens box by means of the screw 29, the other being secured by means of a screw 30 engaging a slot 31 in the spring.

This support is provided with a seat 32 for the lens holder. An adjusting screw 33 is threaded into the lens box and has a swivel connection 34 to the holder so that the lens holders, and consequently the lenses, may be adjusted to and from each other. These lens holders and the lenses are preferably segmental, their flattened portions being arranged adjacent and parallel.

With the parts thus arranged the lenses can be readily adjusted to project the pairs of pictures in superimposed relation and with the image or foreground in registering relation to its mask on the background. The shutter 8 is driven in timed relation to the feeding steps of the feed mechanism.

While the particular apparatus illustrated is satisfactory for the practice of my method, I am aware that the same is capable of very substantial modification so far as the practice of my method is concerned. The apparatus illustrated, however, shows one means for practicing the method and will, it is believed, readily enable those skilled in the art to which the invention relates to practice my inventions in the manner best suited to particular conditions or situations.

Having thus described my invention what I claim as new and desire to secure by Letters Patent is:

1. The method of producing the appearance of relief in motion pictures consisting of projecting upon a screen in superimposed relation a succession of background pictures and a succession of foreground or image pictures, the background pictures having light excluding masks thereon corresponding in size and configuration to the foreground or image pictures, the foreground or image pictures being projected in registering relation to their masks on the background pictures.

2. The method of producing the appearance of relief in motion pictures consisting of projecting upon a screen in superimposed and timed relation a series of background pictures and a series of foreground pictures, the background pictures having masks of a size and configuration corresponding to the foreground pictures thereon.

3. The method of producing the appearance of relief in projected pictures consisting of projecting in superimposed relation a background picture and a foreground or image picture, the background picture having a light excluding mask of a size and configuration corresponding to the foreground picture, the foreground or image picture being projected in registering relation to its mask on the background picture.

4. The method of producing the appearance of relief in projected pictures consisting of projecting in superimposed relation a background picture and a foreground picture, the background picture having a mask of a size and configuration corresponding to the foreground picture thereon.

5. The method of producing the appearance of relief in motion pictures comprising the simultaneous projection upon a single screen of a background picture and a foreground picture, the background picture having thereon a light excluding mask of a size and configuration corresponding to the foreground picture.

6. The method of producing the appearance of relief in motion pictures consisting of simultaneously projecting upon a screen in superimposed relation a background picture and an action picture, the background picture having a mask of a size and configuration corresponding to the action picture and registering therewith.

7. The method of producing the appearance of relief in motion pictures consisting of projecting upon a screen a series of superimposed background and foreground pictures, the background pictures having light excluding masks thereon corresponding in size and configuration to the foreground pictures and registering therewith.

In witness whereof I have hereunto set my hand.

JAKOB BURKHARDT.